United States Patent [19]

Anderson

[11] 4,090,657
[45] May 23, 1978

[54] METHOD AND APPARATUS FOR REPAIRING A RADIATOR

[76] Inventor: Herbert W. Anderson, R.D. #1, Box 211, Jamestown, N.Y. 14701

[21] Appl. No.: 779,080

[22] Filed: Mar. 18, 1977

[51] Int. Cl.² .............................................. B23K 1/02
[52] U.S. Cl. .................................... 228/119; 228/183; 228/189; 228/225; 228/254
[58] Field of Search ............... 228/119, 183, 189, 254, 228/225; 29/157.4

[56] References Cited

U.S. PATENT DOCUMENTS

| 3,237,688 | 3/1968 | Huggins | 228/183 X |
| 3,967,353 | 7/1976 | Pagnotta et al. | 228/189 X |

Primary Examiner—Harold D. Whitehead
Assistant Examiner—K. J. Ramsey
Attorney, Agent, or Firm—Charles L. Lovercheck

[57] ABSTRACT

A method and apparatus for repairing a radiator having a header and tubes that extend into the header which may develop leaks. The apparatus is made up of a U-shaped rod or wire that is slipped over the tube adjacent the header and the U-shaped rod or wire is soldered in place around the tube.

1 Claim, 6 Drawing Figures

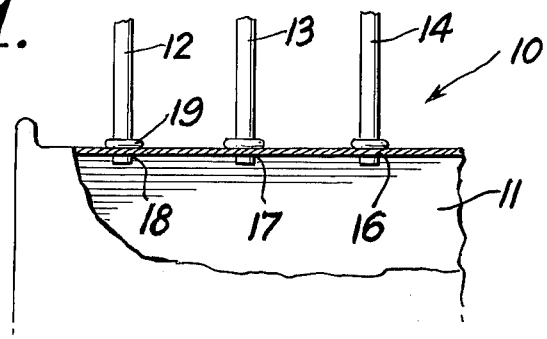
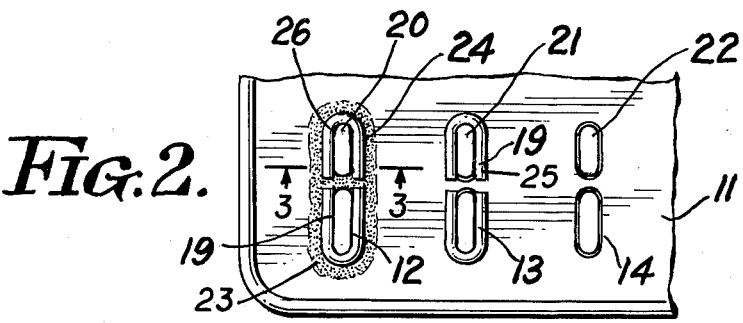
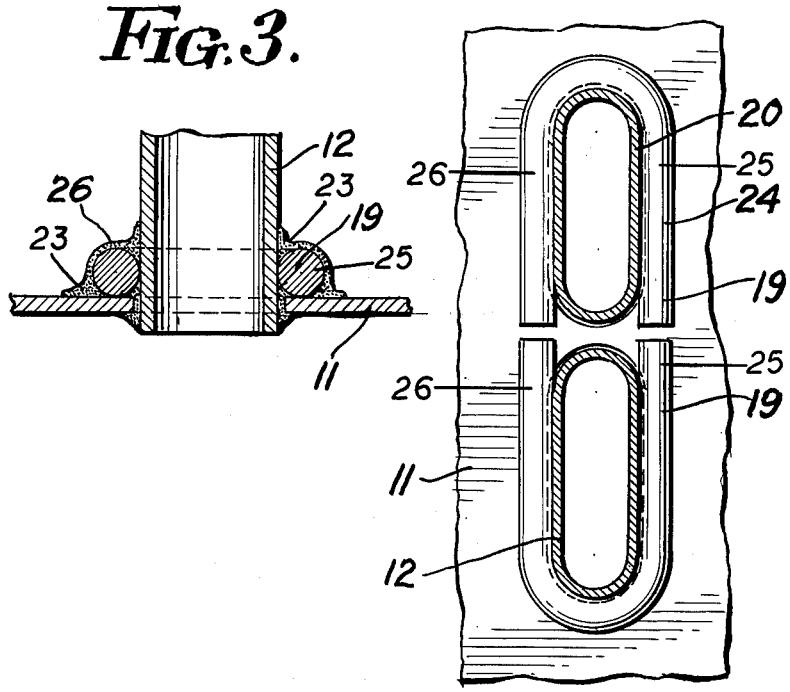

METHOD AND APPARATUS FOR REPAIRING A RADIATOR

GENERAL DESCRIPTION OF THE INVENTION

Automotive radiators and other thin-tubed radiators have tubes that must be attached to a header into which they extend. A leak often develops at the juncture of the tubes and the header. Applicant has discovered that by slipping a U-shaped wire over the tube adjacent the header and soldering the wire to the header and to the tube, a very efficient, reliable joint results.

OBJECTS OF THE INVENTION

It is an object of the invention to provide an improved method of repairing radiators.

Another object of the invention is to provide an improved apparatus in combination with a thin-tubed radiator.

Another object of the invention is to provide an improved radiator repair method which is simple, economical and efficient.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a cross-sectional view of a radiator haing the improved repair method utilized thereon.

FIG. 2 is a top view of the radiator section shown in FIG. 1.

FIG. 3 is a cross-sectional view taken on line 3—3 of FIG. 2.

FIG. 4 is an enlarged top view of two of the radiator tubes.

FIG. 5 is a top view of the U-shaped rod.

FIG. 6 is an end view of the U-shaped rod.

DETAILED DESCRIPTION OF THE DRAWINGS

Now, with more particular reference to the drawings, they show a radiator segment 10 having a header 11 and tubes 12, 13, 14, 20, 21 and 22 which extend upwardly therefrom. U-shaped rods 19 and 24 are supported around the tubes 12 and 20 and the U-shaped rods rest on the header 11.

Prior to slipping the U-shaped rods onto the tubes, the area indicated at 23 is tinned by heating it and applying solder to it and likewise, the lower ends of the tubes 12 and 20 are tinned and the U-shaped rods are tinned and slipped over the tubes. Then, when the header and tubes and U-shaped rods are heated and the solder added, it fills the space between the header and the U-shaped rods and the space between the tubes 12 and 20 and the U-shaped rods 19 and 24.

It will be noted that the U-shaped rods have legs 25 and 26 that are slightly longer than the length of the major dimension of the tubes so that the legs of the U-shaped members extend at least to the ends of the tubes and nearly butt each other when they are placed in position over the tubes. Thus, an efficient area is provided for solder.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method for repairing a radiator having a header and tubes extending through openings in the header comprising, providing a U-shaped rod, tinning said rod, tinning said header with solder around the openings, and placing said U-shaped rod around a said tube on said header and heating said tube, said rod and said header to a temperature sufficient to melt said solder, and adding sufficient solder to seal said tube to said header and coating said rod, said header and said tube with said solder whereby said solder provides a liquid tight joint.

* * * * *